United States Patent [19]
Faust et al.

[11] 3,909,388
[45] Sept. 30, 1975

[54] SELF-CONTROLLED SPRING-ACTUATED TOOL ADVANCE FOR ELECTROCHEMICAL MACHINING

[75] Inventors: Charles L. Faust; John A. Gurklis, both of Columbus, Ohio

[73] Assignee: The United States of America as represented by the Secretary of the Navy, Washington, D.C.

[22] Filed: Dec. 9, 1974

[21] Appl. No.: 531,147

[52] U.S. Cl. .......... 204/224 M; 204/129.5; 204/280; 204/297 R
[51] Int. Cl.² .......................................... C25F 7/00
[58] Field of Search ............ 204/224 M, 129.5, 280; 219/69 E, 69 G

[56] References Cited
UNITED STATES PATENTS
3,330,754  7/1967  Trager .......................... 204/224 M
FOREIGN PATENTS OR APPLICATIONS
253,516  9/1969  U.S.S.R. .......................... 204/129.5

Primary Examiner—G. L. Kaplan
Attorney, Agent, or Firm—R. S. Sciascia; J. A. Cooke

[57] ABSTRACT

A device used in an electrochemical machining trepanning operation wherein a hollow electrode comprises two longitudinally adjacent segments. Attached to one of the segments are a plurality of spacer means for maintaining a gap between the electrode and the workpiece. An insulating member and a spring controlled rod prevent short-circuiting of the electrode.

17 Claims, 5 Drawing Figures

U.S. Patent  Sept. 30, 1975  Sheet 1 of 2  3,909,388
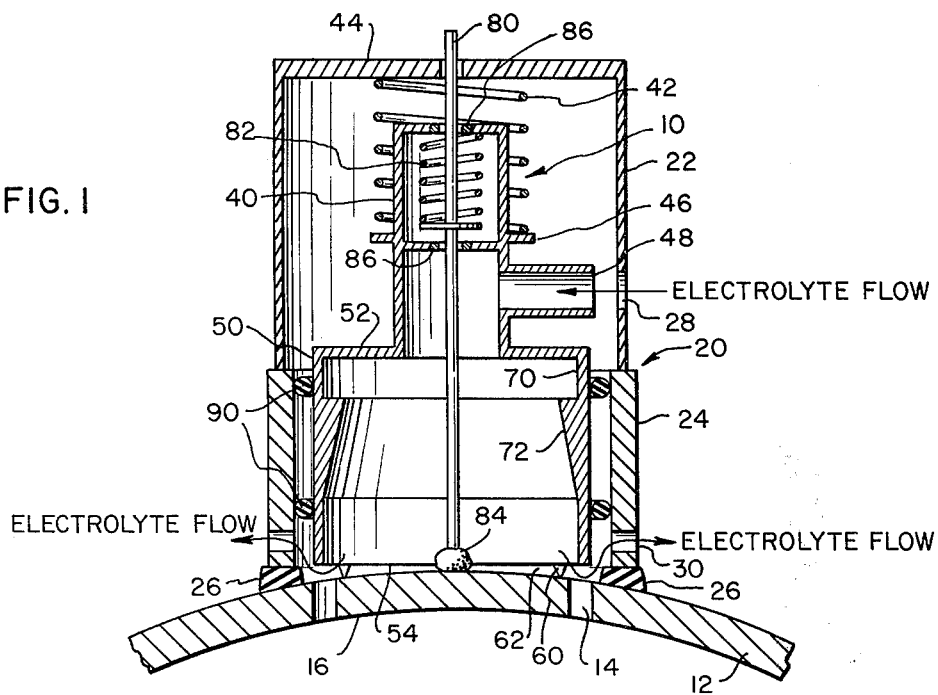
FIG. 1
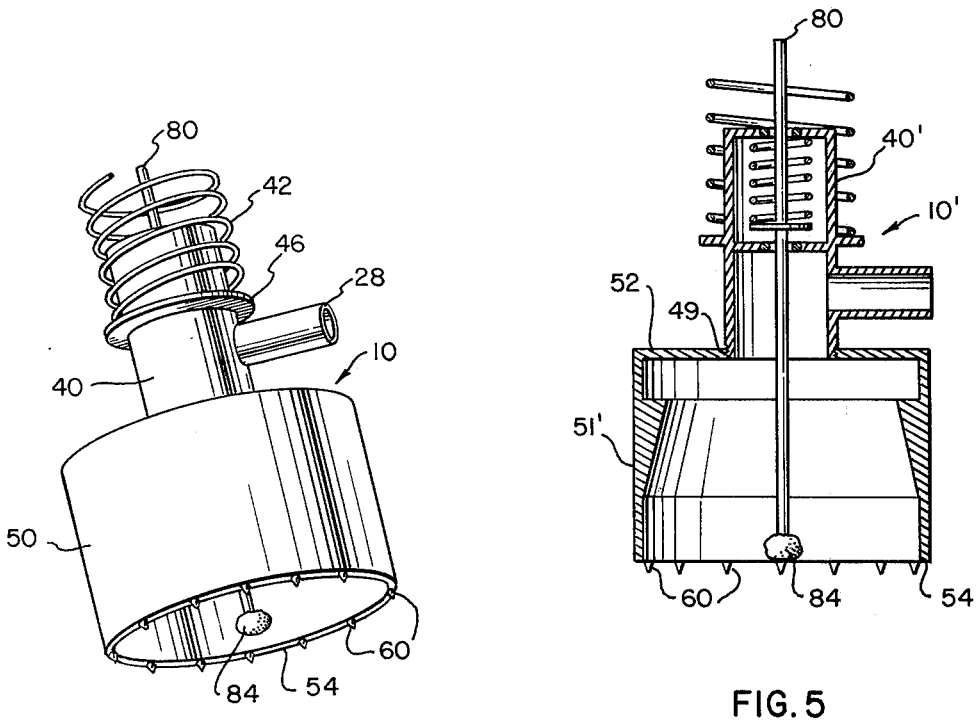
FIG. 2
FIG. 5

SELF-CONTROLLED SPRING-ACTUATED TOOL ADVANCE FOR ELECTROCHEMICAL MACHINING

BACKGROUND OF THE INVENTION

The present invention relates to electrochemical machining and more particularly to electrochemical trepanning operations.

Electrochemical machining (ECM) operations have many advantages over conventional mechanical machining operations, primarily versatility. Operations employing ECM techniques are compatible with a wide variety of workpiece materials which are not ordinarily machinable using ordinary techniques. Further advantages of the ECM techniques, such as high surface finish and low workpiece stress, also contribute to the emergence of ECM as a viable machining technique.

ECM operations commonly comprise an electrically biased electrode tool machining a workpiece. The workpiece is generally the anode and the tool is generally the cathode. Electrolyte is circulated through the interface between the tool and the workpiece to provide the electrolysis environment as well as to cool the system and to wash away precipitated metal sludge formed during the ECM operation. Examples of devices used in ECM operations are found in Fleury, U.S. Pat. No. 3,677,928, Haggerty, U.S. Pat. No. 3,591,473, and Inoue, U.S. Pat. No. 3,474,013.

Safe and efficient on-site disposal of bombs of unknown origin is of concern to the Department of Defense. Accordingly there is interest in various methods of gaining entry to bomb casings in order to steam out the explosive charge in the field. ECM techniques offer a quiet, nonmechanical, cool and fast method for effecting such openings. Such bomb disposal techniques are also of interest to local police departments as well.

One recent development in ECM techniques which is of particular use in opening containers such as bomb casings is a trepanning procedure. Examples of devices used in general trepanning operations are found in Williams, U.S. Pat. No. 1,780,325, Kraus, U.S. Pat. No. 2,188,631 and Hainault, U.S. Pat. No. 2,525,669. ECM trepanning techniques can be used under a variety of operating conditions wherein the trepanning machine can be mounted on the bottom, side, top or other intermediate position of a workpiece, such as a bomb casing.

ECM techniques have not been generally adapted to trepanning operations for several reasons. The primary reason inhibiting the adaptation of ECM techniques to trepanning operations has been the high possibility of short-circuiting the electrode during the trepanning operation. As trepanning produces a slug or core of material which is often deposited inside a hollow electrode, short-circuits are a distinct possibility. If a slug or workpiece material is not evenly separated from the workpiece, the slug may tip or tilt against one portion of the electrode, thus short-circuiting the ECM device.

The tilting of workpiece slugs produces another factor which has inhibited development of ECM trepanning techniques. If the slug is tilted, the gap between the electrode and the workpiece is uneven thus effecting the pattern and rate of electrolyte flow. Uneven electrolyte flow creates several problems, an example of which is uneven surface finishes. However, the most serious danger to ECM operation caused by uneven electrolyte flow is again short-circuiting. If electrolyte flow is uneven, machining is uneven, hence one portion of an electrode may advance faster than another portion of that electrode, thus resulting in an effective tilting of the workpiece slug which often results in short-circuiting the electrode.

Attempts at solving this short-circuiting problem have been made. Trager, U.S. Pat. No. 3,330,754 and 3,383,296 are examples of such attempts. The Trager patents purport to solve the short-circuiting problem by controlling the actions of the workpiece slug formed by the trepanning operation. Such devices, as exemplified by the Trager patents, still suffer several drawbacks, in particular, the gap between the electrode and the workpiece is not controlled. Thus, there remains a problem of shortcircuiting as a result of slug tilting.

While devices for controlling the gap size in ECM operations are known (e.g., Pahl, U.S. Pat. No. 3,801,487), these devices are neither simple nor reliable. Most importantly, however, these devices are not adaptable to trepanning operations, especially on-site ECM trepanning procedures such as those required for bomb disposal techniques.

The present invention overcomes the above-discussed drawbacks by providing a simple, mechanical device which prevents short-circuiting of an electrode during an ECM trepanning.

SUMMARY OF THE INVENTION

Briefly, the present invention is a device used in an electrochemical machining trepanning operation. The device comprises a hollow electrode positioned inside a housing. The housing has two sections, a spider section having an electrolyte inlet therein and a canister section positioned adjacent a workpiece. The canister has therein an electrolyte exit. Positioned between the canister section and the workpiece is a leakage seal which prevents electrolyte from leaking out of the housing. An electrolyte flow system comprising pumps, filters and the like is positioned exterior to the housing.

The electrode comprises two longitudinally adjacent segments, a first segment attached at one end to the top face of a second segment and having a spring positioned at the other end thereof adjacent the top of the housing. The spring controls the advancement of the electrode during the trepanning operation by exerting force on the housing.

The electrode second segment comprises an insulating member positioned longitudinally on the inner surface of the segment. The insulating member prevents contact between a slug removed from a workpiece and the electrode. If such contact is not prevented, the slug may short-circuit the electrode through contact therewith. The bottom face of the electrode second segment is formed by the bottom circumferential edge of the second longitudinal segment and this edge is positioned adjacent the workpiece. A plurality of spacer means are positioned on this bottom face. The spacers are positioned between the electrode and the workpiece and provide a gap between the electrode and the workpiece.

The spacers provide several important advantages to the device of the present invention. A constant gap size is maintained by the spacers despite surface irregularities in a workpiece. The spacers also provide protection against short-circuiting of the electrode. A variety of factors may contribute to an uneven cut by the electrode (e.g., uneven workpiece thickness). Without the spacers, a slug of material removed by the trepanning process may tilt and contact the electrode thus short-circuiting the operation. The spacers prevent such contact. The spacers thus provide a simple, reliable mechanical means for maintaining the proper gap size between an electrochemical machining trepanning electrode and a workpiece. The spacers also provide versatility to the present invention. The spacers can be interchanged to provide a variety of gap sizes thus providing an optimized trepanning procedure.

A rod having on one end a spring and on the other end adhesive is positioned longitudinally within the electrode. The adhesive is positioned adjacent the workpiece and further insures against contact between the slug and the electrode.

The electrode is supported on the workpiece by an adjustable support means comprising cantilever support arms mounted at one end to a movable base and having mounted at the other end thereof means for connecting the arms to the electrode. The support means allows the trepanning operation to be performed "on site." Thus, a workpiece which may be expensive or dangerous to move can be machined by bringing the machining equipment to the workpiece rather than vice-versa.

An object of the present invention is to provide an improved electrochemical machining trepanning device.

Another object of the present invention is to insure that a gap between an electrochemical trepanning electrode and a workpiece is reliably maintained during operation of the device for a variety of conditions.

Yet another object of the present invention is to provide versatility to an electrochemical trepanning device.

Still another object of the present invention is to reliably prevent short-circuiting of an electrode during an electrochemical machining trepanning operation.

A further object of the present invention is to provide in situ adjustability to an electrochemical trepanning device.

BRIEF DESCRIPTION OF THE DRAWINGS

A more complete appreciation of the invention and many of the attendant advantages thereof will be readily appreciated the same becomes better understood by references to the following detailed description when considered in connection with the accompanying drawings wherein:

FIG. 1 shows an electrochemical trepanning device according to the present invention;

FIG. 2 is a perspective view of the trepanning electrode of the present invention;

FIG. 5 shows an alternative embodiment of the electrode of the present invention.

DESCRIPTION OF THE PREFERRED EMBODIMENTS

Figure 4:
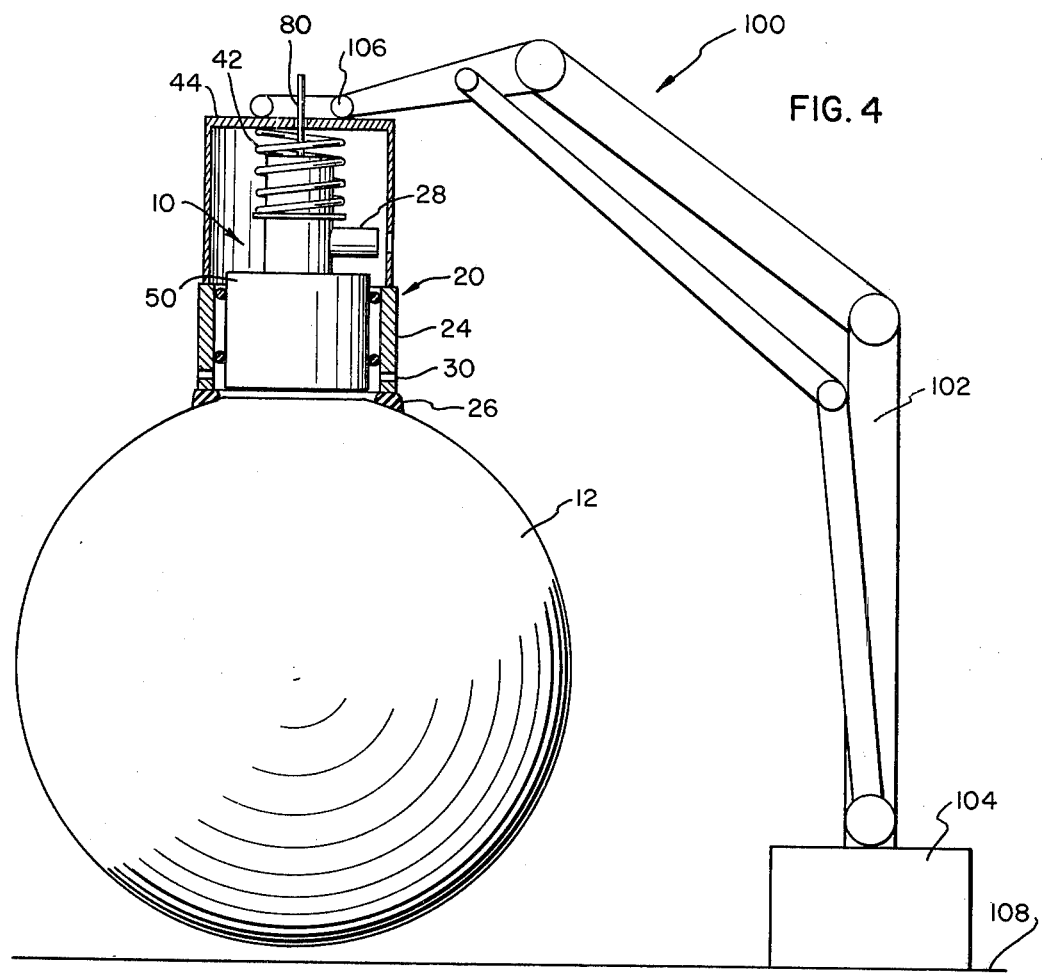
FIG. 4 shows the device of the present invention including an adjustable support fixture.

Referring to the drawings, FIG. 1 shows a trepanning electrode 10 positioned on a curved workpiece such as bomb case 12. Material removal from the bomb case occurs along cut-out lines 14 and a slug 16 is formed by the electrochemical machining (ECM) operation as electrode 10 advances into the workpiece. The trepanning process comprises the usual electrolytic dissolution method wherein electric potential is applied so as to make the workpiece anodic and the electrode cathodic. As will hereinafter be described, electrolyte circulates between the electrode and the workpiece.

Figure 3:
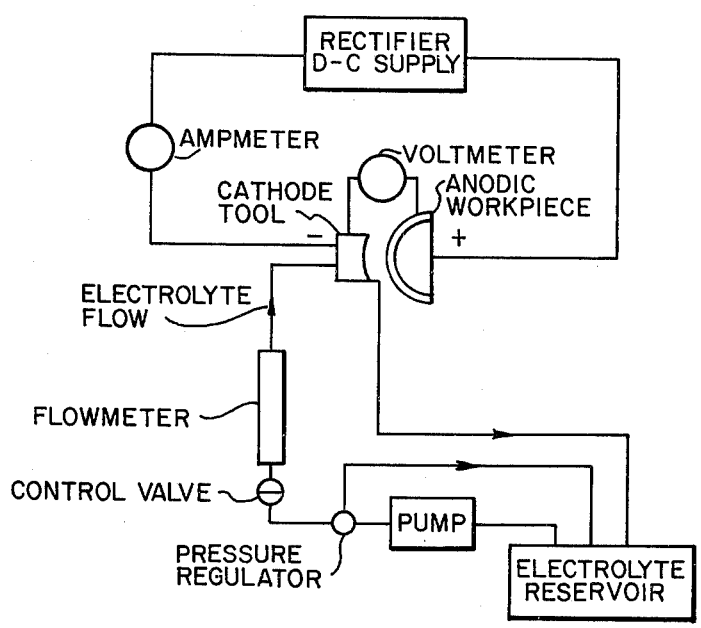
FIG. 3 shows a schematic of electrolyte flow and electrical circuits for the ECM trepanning operation of the present invention.

The electrode 10 is positioned in a housing 20 comprising spider section 22 and canister section 24. Rubber leak rings 26 support housing 20 on the bomb casing 12 and prevent electrolyte leakage. Electrolyte is supplied to the electrode 10 via inlet 28 through spider section 22 and exits the electrode through exit 30 in canister section 24. The electrolyte flow systems can be any suitable system such as a pump, PVC tank system or the like which recirculates the electrolyte. The electrolyte system may also comprise heating, cooling or filtering means if so desired. Any suitable electrolyte, such as a solution of sodium perchlorate, potassium perchlorate, sodium chloride or sulfuric acid may be used. A typical electrolyte flow system is shown in FIG. 3.

Positioned within housing 20 is electrode 10 which comprises at least two longitudinally adjacent segments arranged essentially perpendicular to the workpiece. A first segment 40 is tubular and has a spring 42 attached at one end thereof adjacent top 44 of housing 20 to control the rate and amount of electrode advancement into the workpiece. The spring 42 contacts top 44 and thereby produces the advancing force required to drive the ECM tool into bomb case 12. The flange 46 maintains spring 42 in the proper position relative to segment 40. At the opposite end of segment 40 a tubular second segment 50 is attached at face 52 thereof. An electrolyte inlet 28 is positioned between flange 46 and the end of segment 40 adjacent face 52 of segment 50. As shown, the cross-sectional diameter of segment 50 exceeds that of segment 40, however, this is not a requirement to the operation of electrode 10. Adjacent the workpiece is face 54 of electrode segment 50. As shown in FIG. 2, the face 54 is merely the lower circumferential edge of electrode second segment 50.

In order to prevent contact between the workpiece and the electrode 10 thus short-circuiting the operation, insulating spacers such as pegs 60 are provided on face 54 of the electrode segment 50. The spacers are positioned adjacent the workpiece to maintain a predetermined gap such as gap 62 between the workpiece and the electrode as the electrode advances into the workpiece. Thus, spacers 60 precede the electrode face 54 into the cut-out areas, such as shown at cut-out lines 14 in FIG. 1. Not only does the gap 62 prevent short-circuiting of electrode 10, it also maintains a clearance between the electrode and the workpiece thus allowing free flow of electrolyte therebetween. The electrolyte flow cools the work area and removes any precipitated metal sludge or the like produced by the trepanning process.

Spacers 60 may be conical or triangular pegs, rods, or any other suitable shape. Materials used for the spacers should be chosen to retain the chosen spacer shape and gap size. Thus materials which will not crack, chip, squash or erode are preferable. Typical materials for spacers 60 are: nylon, polycarbonate, sapphire, ruby, quartz, alumina, glass-filled or reinforced plastic and Pyrex.

As can be seen, the spacers are an important feature of the electrode. The electrode moves around a curved workpiece which may have an irregular surface. As the electrode encounters surface irregularities, the spacers working in conjunction with spring 42 allow the electrode gap 62 to be maintained at the optimum size. Without the spacers, surface irregularities of the workpiece may cause short-circuiting of electrode 10 or cause gap 62 to exceed the optimum size. Furthermore, the electrode 10 may even accommodate workpiece surface irregularities which cause the electrode to tip, i.e., force one portion of the electrode higher than another portion. Without the adaptability provided by the spacers and the spring, electrolyte flow may become irregular under such a tipped condition, or short-circuiting may occur. Either condition is not desirable. However, because the spacers and the spring maintain gap 62 constant, the electrode 10 will not be forced into a tipped condition relative to the workpiece.

Adaptibility is an additional advantage provided to electrode 10 by spacers 60. If the electrode is to be used on a variety of workpieces, the spacers and spring 42 automatically adjust the size of gap 62. Thus, the gap size need not be reset each time the electrode is used on a new workpiece. The spacers 60 thus are a simple, efficient, mechanical means for automatically and reliably adjusting the ECM gap to the optimum size. Such a feature is important to operations wherein the trepanning operation is to be carried out in an area which is not easily accessable, such as are often found on bomb disposal sites.

If spacers 60 are removable, on-site or in-situ changes can be made to gap 62. Thus, if one gap size proves to be inefficient, merely changing spacer means will produce another size for gap 62.

To further insure against accidental short-circuiting of electrode 10, insulation 70 can be applied to the inside and outside surfaces of the electrode. The insulation 70 may be an adherent epoxy-resin coating.

Further protection against short-circuiting of electrode 10 is provided by insulating member 72 positioned longitudinally on the inner surfaces of electrode second segment 50. The member 72 is shown as triangular in shape, but may be any other shape which prevents contact between any workpiece material and the inner surface of segment 50. Thus, without member 72, if slug 16 does not break along all cut-out lines simultaneously, slug tipping may cause electrode shorting. The insulating member 72 prevents such shorting.

A further protection against short-circuiting of electrode 10 by the tipping of slug 16 is provided by rod 80 having spring 82 on one end and adhesive 84 on the other end. The rod 80 runs longitudinally inside of electrode 10 and has the adhesive 84 positioned adjacent the workpiece surface. Grommets 86 support spring 82 and prevent electrolyte leakage. The grommets also allow adjustment of the position of rod 80. As the electrode advances into the workpiece, adhesive 84 on the rod 80 contacts slug 16 and the rod is thus forced upward against the resisting force of spring 82. The rod thus reinforces the slug in position and prevents tipping thereof. While the rod is desirable, it is not required for the proper functioning of electrode 10.

Positioned about electrode second segment 50 between that segment and the inner surface of housing canister 24 are a plurality of O-rings 90. The O-rings permit downward movement of electrode 10 while preventing electrolyte loss upward via a path outside of electrode 10.

Shown in FIG. 4 is an adjustable support fixture 100 for a trepanning operation. Fixture 100 comprises cantilever arms 102 connected at one end to a movable base 104 and at the other end to electrode housing 20 at joint 106. The base 104 is heavy enough to maintain the trepanning fixture 100 in place while resting on a flat surface, such as the ground 108. Base 104 may be used to house the pump for the electrolyte flow system and/or any other equipment used in the trepanning operation. The fixture 100 exerts enough pressure on the electrode housing to position canister 24 and seals 26 securly against the bomb casing 12. Because of the cantilever configuration, the arms 102 can be easily moved to remove the electrode housing.

The adjustable support fixture provides portability to the trepanning system. Thus, the entire system, electrode, support and all can be transported and the complete trepanning operation can be conducted on site. The workpiece thus need not be transported to a machine shop or other trepanning site. The advantage is important in many applications wherein transporting the workpiece to the trepanning site may be expensive, inconvenient or dangerous, such as in bomb dearming applications.

A trepanning operation using the electrode 10 may for example be performed as follows: the workpiece 12 is positioned on an anodic plate; leak seals 26 are positioned at the appropriate position on the workpiece; electrode 10 and the housing are positioned adjacent the seals; the adjustable support fixture is positioned; position of the electrode is checked; the electrode 10 is moved into position by adjusting spring 42 until spacers 60 are in contact with the workpiece surface and the spring 42 is set; the electrolyte system is connected via inlet 28 and exit 30 and is turned on; power is turned on and the trepanning operation is carried out.

Shown in FIG. 5 is an electrode 10' which is an alternative embodiment of electrode 10. Electrode 10' includes a second longitudinal segment 40' which is detachable from segment 51' and allows easy and quick trepanning tool changes in the event hole sizes are to be varied. One means for attaching segments 40' and 51' may, for example, be screw threads 49.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A trepanning electrode adapted to be used in an electrochemical machining operation comprising:
   a hollow body, said body comprising first and second longitudinally adjacent hollow segments;
   a spring means for controlling advancement of the electrode towards a workpiece, said spring means being positioned on said first body segment;
   spacer means for separating said electrode from said workpiece, said spacer means being positioned on said second body segment in such a manner as to oppose advancing force exerted by said spring means; and
   insulating means positioned on the inside of said second segment for preventing contact between material removed from said workpiece and said electrode.

2. The trepanning electrode of claim 1 including a rod for preventing contact between material removed from said workpiece and said electrode, said rod being positioned longitudinally within said electrode.

3. The trepanning electrode of claim 2 wherein said rod has on one end a spring for maintaining said rod in position within said electrode and on the other end adhesive for holding material removed from said workpiece during the electrochemical machining operation.

4. The trepanning electrode of claim 2 including a grommet positioned on said first segment for maintaining said rod spring in position.

5. The trepanning electrode of claim 1 including electrolyte entrance and exit means whereby electrolyte flows through said electrode.

6. The trepanning electrode of claim 5 wherein said electrolyte entrance means is positioned on said first body segment and said electrolyte exit means is positioned on said second segment.

7. The trepanning electrode of claim 1 including a housing for said electrode, said housing comprising:
frame means positioned about said electrode;
sealing rings positioned between said frame means and said workpiece for preventing electrolyte leakage;
a plurality of O-rings positioned around said electrode second segment between said electrode and said housing means;
electrolyte entrance means through said frame means; and
electrolyte exit means through said frame means.

8. The trepanning electrode of claim 7 wherein said frame means comprises at least two segments, a first segment comprising a support spider and a second segment comprising a support canister.

9. The trepanning electrode of claim 1 wherein said first and second longitudinal segments are separable from each other.

10. The trepanning electrode of claim 9 wherein said first and second longitudinal segments are threadably connected together.

11. The trepanning electrode of claim 1 wherein said insulating members are triangular and positioned longitudinally along the inside of said second segment.

12. The trepanning electrode of claim 1 wherein said spacer means are conical pegs.

13. The trepanning electrode of claim 1 wherein said spacer means are triangular pegs.

14. The trepanning electrode of claim 1 wherein said spacer means are manufactured from a glass-filled plastic.

15. The trepanning electrode of claim 1 wherein said spacer means are manufactured from a fiber reinforced plastic material.

16. The trepanning electrode of claim 1 wherein said spacer means are manufactured from quartz.

17. The trepanning electrode of claim 1 wherein said spacer means are removable.

* * * * *